(12) United States Patent
Boissinot et al.

(10) Patent No.: US 9,763,467 B2
(45) Date of Patent: Sep. 19, 2017

(54) METHOD AND SYSTEM FOR PREPARATION OF FRESH COOKED MEALS

(75) Inventors: Jean-Claude Boissinot, Saint Gilles Croix de Vie (FR); Jean-Sébastien Chasles, Bournezeau (FR)

(73) Assignee: FLEURY MICHON, Pouzauges (FR)

( * ) Notice: Subject to any disclaimer, the term of this patent is extended or adjusted under 35 U.S.C. 154(b) by 0 days.

(21) Appl. No.: 14/126,174

(22) PCT Filed: Jun. 8, 2012

(86) PCT No.: PCT/EP2012/060883
§ 371 (c)(1),
(2), (4) Date: Mar. 17, 2014

(87) PCT Pub. No.: WO2012/171852
PCT Pub. Date: Dec. 20, 2012

(65) Prior Publication Data
US 2014/0193554 A1     Jul. 10, 2014

Related U.S. Application Data

(60) Provisional application No. 61/496,350, filed on Jun. 13, 2011.

(51) Int. Cl.
*A23L 35/00*     (2016.01)
*A23L 3/02*     (2006.01)
(Continued)

(52) U.S. Cl.
CPC ...... *A23L 1/48* (2013.01); *A23L 3/02* (2013.01); *A23L 3/10* (2013.01); *A23L 3/3445* (2013.01);
(Continued)

(58) Field of Classification Search
CPC ..... A23L 1/48; A23L 35/00; A23L 3/02; A23L 3/36; A23L 3/3445; A23L 3/10; A23L 3/362
See application file for complete search history.

(56) References Cited

U.S. PATENT DOCUMENTS 4,805,524 A      2/1989   Deneuville et al.
5,904,946 A *    5/1999   Kemp et al. .................. 426/412
(Continued)

FOREIGN PATENT DOCUMENTS

EP      592710 A1 *    4/1994
EP     0592710 A1      4/1994

OTHER PUBLICATIONS

Jay et al. Modern Food Microbiology, 7$^{th}$ Edition.2005. pp. 602.*
(Continued)

*Primary Examiner* — Viren Thakur
*Assistant Examiner* — Thanh H Nguyen
(74) *Attorney, Agent, or Firm* — David D. Brush; Westman, Champlin & Koehler, P.A.

(57) ABSTRACT

The present invention relates to a method for preparing a ready-to heat, preservative free meal, comprising selecting at least one food product; preparing each food product; placing the prepared food products within a container; thermalizing; cooling down; and conditioning. The ready-to heat, preservative free meal comprises at least one of a protein portion, a portion of slow carbohydrates and a portion of vegetables.

10 Claims, 4 Drawing Sheets

(51) Int. Cl.
*A23L 3/36* (2006.01)
*A23L 3/3445* (2006.01)
*A23L 3/10* (2006.01)
*A23L 1/48* (2006.01)

(52) U.S. Cl.
CPC .............. *A23L 3/36* (2013.01); *A23L 3/362* (2013.01); *A23L 35/00* (2016.08)

(56) References Cited

U.S. PATENT DOCUMENTS

| | | | |
|---|---|---|---|
| 7,285,299 B1* | 10/2007 | Howard | 426/129 |
| 7,550,166 B2* | 6/2009 | Caselli et al. | 426/393 |
| 7,862,318 B2* | 1/2011 | Middleton et al. | 425/112 |
| 2004/0079091 A1* | 4/2004 | Goseling et al. | 62/62 |
| 2005/0074532 A1 | 4/2005 | McMaster et al. | |
| 2006/0222747 A1* | 10/2006 | Thomas | A23B 4/005 426/407 |
| 2010/0227028 A1* | 9/2010 | Nove | 426/129 |
| 2011/0123693 A1 | 5/2011 | Egana | |

OTHER PUBLICATIONS

International Search Report dated Jul. 11, 2012 for corresponding International Application No. PCT/EP2012/060883, filed Jun. 8, 2012.

International Preliminary Report on Patentability and English Translation of Written Opinion dated Dec. 17, 2013 for corresponding International Patent Application No. PCT/EP2012/060883, filed Jun. 8, 2012, 6 pages.

* cited by examiner

US 9,763,467 B2

METHOD AND SYSTEM FOR PREPARATION OF FRESH COOKED MEALS

CROSS-REFERENCE TO RELATED APPLICATIONS

This Application is a Section 371 National Stage Application of International Application No. PCT/EP2012/060883, filed Jun. 8, 2012, which is incorporated by reference in its entirety and published as WO 2012/171852 on Dec. 20, 2012, in English.

FIELD OF THE INVENTION

The present invention relates to convenience meals. More specifically, the present invention is concerned with a method and a system for preparation of fresh cooked meals without preservative.

BACKGROUND OF THE INVENTION

In the food industry, cooked food is available under a number a forms. Freezing allows preserving cooked food from the time it is prepared to the time it is eaten. Pasteurized fresh precooked food, i.e. precooked then heated at 90° C. during a minimum of 10 minutes, can achieve a shelf life of 30 days, up to 45 days for example, dating from the day of production. However, pasteurized fresh precooked food has an industrial look that may not be appealing to consumers.

There is need in the art for fresh convenience food.

SUMMARY OF THE INVENTION

More specifically, in accordance with the present invention, there is provided a method for preparing a ready-to heat, preservative free meal, comprising selecting at least one food product; preparing each food product; placing the prepared food products within a container; thermalizing; cooling down; and conditioning.

Said selecting at least one food product may comprise selecting at least one of a protein portion, a portion of slow carbohydrates and a portion of vegetables. Said selecting at least one food product may comprise selecting at least one of a protein portion, a portion of slow carbohydrates, a portion of vegetables and a dressing.

Said preparing each food product comprises for example at least one of precooking meat or fish, precooking rice or pasta, defrosting or scalding vegetables, preparing a purée, and preparing a dressing.

Said placing the prepared food products within a container comprises, in a particular embodiment, separately placing and visually arranging each prepared food product within the container.

Said thermalizing comprises for example placing the container, uncovered, with the different prepared food products disposed therein within an oven, controlling the dew point of the food products and reaching one of: i) a core temperature of 70° C. during 1 minute, and ii) an instantaneous temperature of 72° C.

Alternatively, said thermalizing may comprise placing containers, uncovered, with the different prepared food products disposed therein within an oven, without contact between the containers, controlling the dew point of the food products and reaching one of: i) a core temperature of 70° C. during 1 minute, and ii) an instantaneous temperature of 72° C.

In this case, the method may comprise positioning containers on between about 85% and about 95% of the available surface of the oven.

The method may further comprise adding an amount of dressing, prepared in said step of preparing each food product and maintained at a temperature of at least 72° C. to the container after said thermalizing.

Said cooling down comprises for example continuously cooling down the container to a temperature comprised in a range between about 0° C. and about 4° C., in a time comprised between about 30 and about 120 minutes.

Said conditioning may comprise individually sealing the container with a barrier film under controlled atmosphere. Said conditioning may comprise individually sealing the container with a barrier film using a sealing ring.

The method according to the invention may further comprise one of:
i) freezing the container and its content after conditioning; and
ii) maintaining the container and its content at a temperature comprised in a range between about −1° C. and about +1° C.

The container may be made in a material suitable for food use and resistant to temperatures of at least 80° C.

The container is made for example in a material suitable for food use and resistant to temperatures comprised in a range between about 80° C. and 140° C.

Said cooling down and conditioning are advantageously carried out in clean room conditions.

Said step of cooling down after said step of thermalizing comprises for example cooling at a temperature in a range between about −8° C. and −10° C. for a duration comprised in a range between about 30 and 40 minutes.

Said step of thermalizing may be followed by a further cooling step at a temperature in a range between about −8° C. and −10° C. to reach a core temperature in a range between about 0° C. and +4° C.

Said step of cooling down after said step of thermalizing comprises for example cooling to reach a core temperature in a range between about 30° C. and 40° C.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 1:
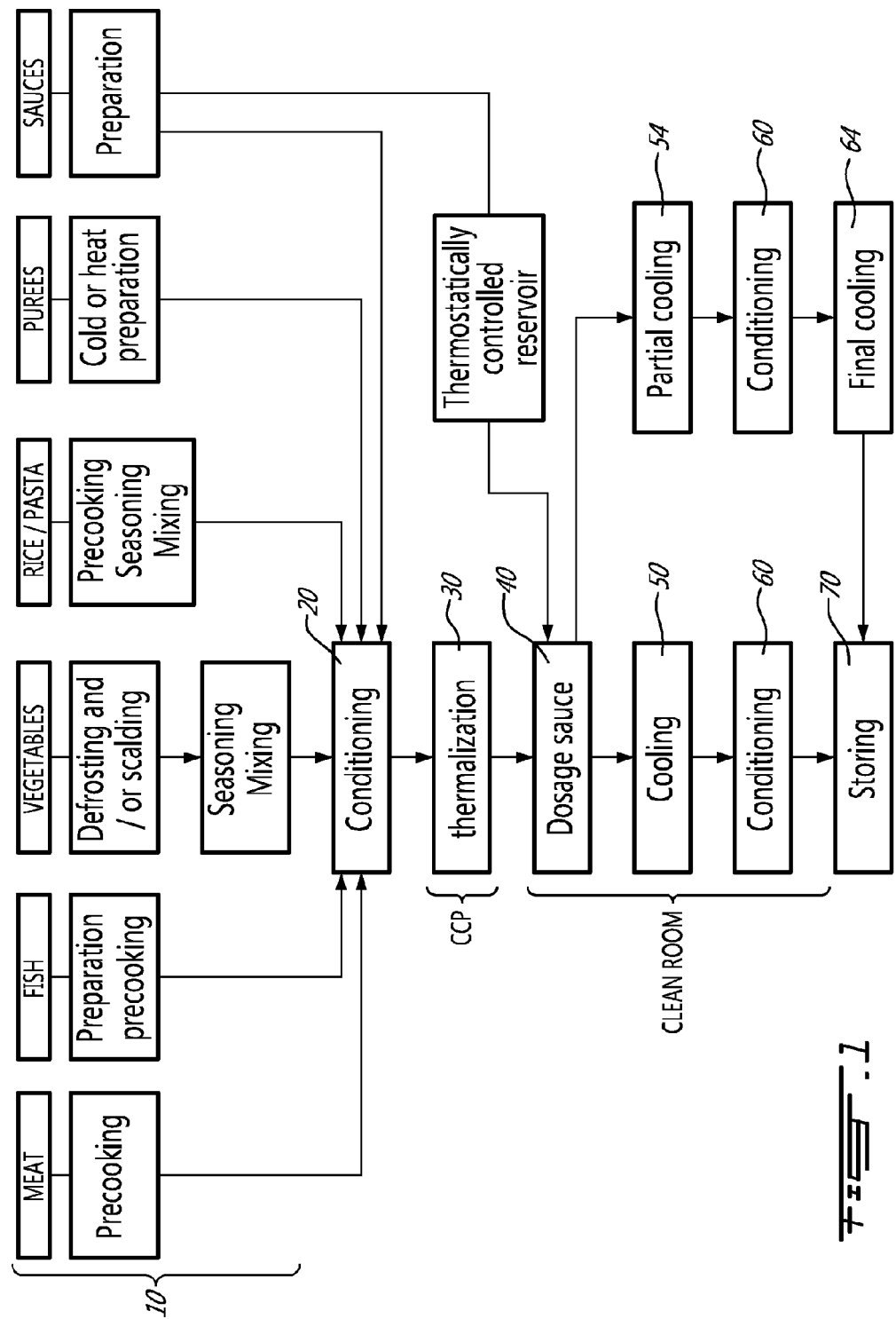
FIG. 1 is a flowchart of a method according to an embodiment of an aspect of the present invention.

According to an embodiment of a method of the present invention as illustrated in FIG. 1 for example, a multi-ingredient meal is elaborated, typically by selecting a meat or fish, vegetables and a starchy food (rice, pasta or a purée) for example. The meat or fish, and the rice or pasta are precooked, the vegetables are either defrosted or scalded, and the purée is cold or hot prepared (step 10). The vegetables and rice or pasta may be seasoned at this stage. Then each portion is placed and visually arranged in a container (step 20). The container with the different portions thus disposed therein is placed within an oven for thermalization, i.e. so as to reach a core temperature of generally at least 72° C., as will be described hereinbelow (step 30).

In step 10, the combination of selected food portions may vary. The combination may typically comprise a protein portion, a portion of slow carbohydrates and a portion of vegetables. The combination may also be vegetarian for example. Sauces are prepared at a temperature of at least 80° C. to allow a desired liaison and texture.

Precooking of each food portion is achieved at a temperature depending on the composition of each food portion as known in the art, and taking into account the subsequent preparation steps, which include further heating, in order to obtain a target texture and preserve the visual and gustatory characteristics of each food portion, which may include most varied ingredients such as, for example, zucchinis, peas, seafood etc. . . . . .

In step 20, arranging the food portions within the container is performed so as to obtain visually pleasing see-through containers for example. For example, each food portion may be laid out in separate layers, including for example a layer of meat pieces of 5 to 30 mm, a layer of pieces of vegetables, a layer of sauce, each layer remaining separate and distinct from the other.

In step 30, thermalization allows reducing the pathogenic flora, thereby increasing the shelf life of the prepared meal. The containers are placed, uncovered, within continuous or batches mixed ovens, which are able to produce convection and vapor injection, thereby allowing a controlled heating process, by preventing drying of the food for example. The dew point of the food is measured, so as to reach a core temperature, or critical control point (CCP), of 70° C. during about 1 minute, or an instantaneous temperature of 72° C. In the case of a bulky meat portion for example, it is found that reaching a surface temperature of 72° C. suffices to ensure the desired shelf life, since it has already been precooked before. Reaching 72° C., without remaining there longer that about one minute for example, is sufficient to reduce the pathogenic flora. This heat surge does not cause drying of the food or deposition of humidity in the bottom of the containers. The objective is not to cook the food further, but to allow it to reach a temperature sufficient to reduce the pathogenic flora.

It was found that positioning the containers in the thermalization oven in a way that accommodates space for air and humidity, without contact between the containers, yields an enhanced homogeneity of the temperature achieved, as well as improved coloration properties of the food and minimized deformation of the containers. About 85% to 95% of the available surface of the oven is used by containers.

In step 40, when the containers exit the thermalization ovens, an amount of dressing, prepared in step 10, and maintained at a temperature of at least 72° C. in a thermostatically controlled reservoir, may be added to the containers, besides the already disposed food portions. Depending on the meal and on the texture of the sauces, the sauces, such as curry sauce, couscous sauce, crushed tomato sauce, may also be added prior to the rethermalization step (step 30).

Then the containers are continuously cooled down to a temperature comprised in a range between about 0° C. and about 4° C., in a time as reduced as possible without degradation of the meal, for example between 30 and 120 minutes at an average temperature between about −8° C. and −10° C. (step 50).

Once thus cooled down, each container is individually sealed with a barrier film under controlled atmosphere, such as nitrogen and $CO_2$ (step 60). Alternatively, the containers may be individually sealed under partial vacuum and reinjection of noble gas, with between about 0 and 5% oxygen. Still alternatively, once cooled down the containers may be frozen for delayed distribution for example: they may be later defrosted and commercialized, while still benefiting from an extended shelf life. Still alternatively, the containers may be maintained at a temperature between about −1° C. and +1° C., which allows increasing the shelf life by another 5 days, for meals such as curry chicken with vegetable rice; beef kefta with moroccan vegetables; or lardoons eggs with cream spinach for example (step 70).

Sealing films with anti-fog properties may be selected.

Alternatively, after thermalization (step 40), a partial cooling (step 54) may take place, at a temperature comprised between about −8° C. and −10° C. during between about 30 and 40 minutes, which allows reaching a core temperature comprised between about 30° C. and 40° C. Then, sealing (step 60) is achieved, and a further cooling step (step 64) is performed at a temperature between about −8° C. and −10° C. so as to reach a core temperature between about 0° C. and +4° C.

The present method allows preventing condensation on the inner surface of the sealing film and to produce a range of fresh cooked meals, including meat or fish, vegetables, starchy food and gravies, without preservative, and optimized appearance, organoleptic qualities and texture combined to a high microbiologic quality.

The containers may be made in a range of materials suitable for food use and resistant to temperatures of at least 80° C., for example between 80° C. and 140° C. Crystalline polyethylene terephthalate (CPET), polypropylene (PP), and coated paperboard, with or without CPET reinforcement, may be used for example. Suitable biodegradable materials may be used, such as, for example, wooden tray, baking paper etc. . . . .

Figure 3A:
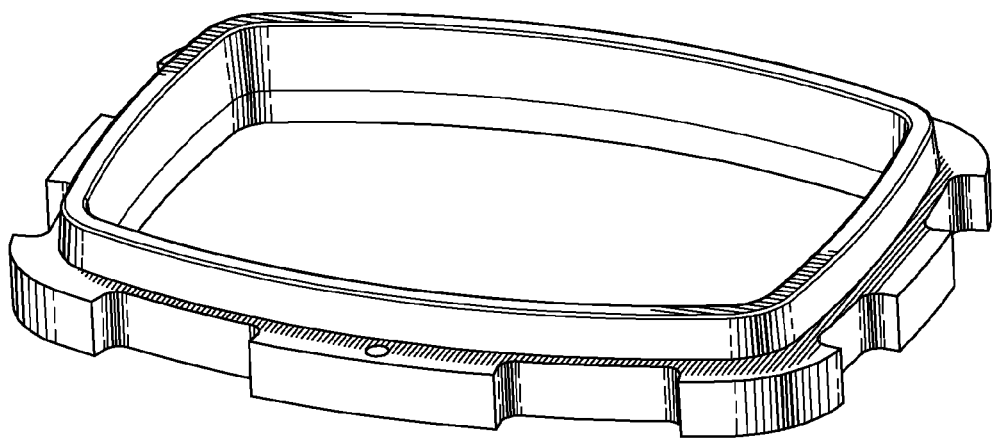
FIG. 3 shows FIG. 3a) a perspective view, FIG. 3b) a top view, and FIG. 3c) a section view, of a sealing ring according to an embodiment of an aspect of the present invention.
Figure 3B:
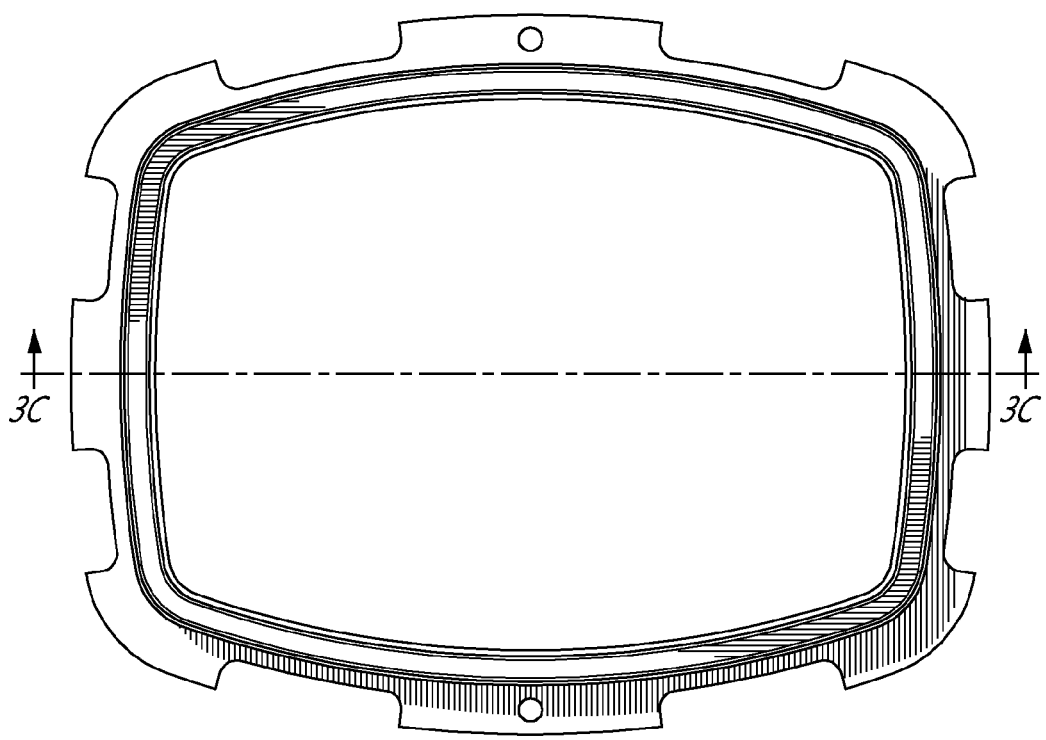
Figure 3C:
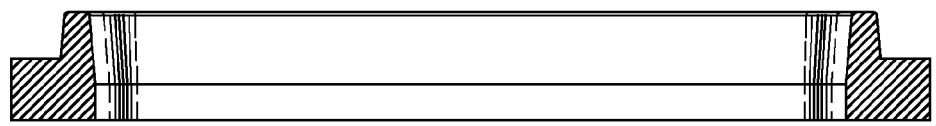

In the case of containers that may slightly vary in shape, for example experience a variation of circumference of between about 0.5 and 2 mm due to the different temperature conditions submitted thereto, for example containers made in PP, a sealing ring as illustrated in FIG. 3 may be used in the conditioning step 60. The ring is positioned about the container, for sealing a transparent film on top of the container, thereby correcting any deformation of the container.

The container may be at least partly provided with a paperboard case so as to prevent discoloration of the food, during storage in refrigerated shelves using ultraviolet lighting, which, combined with presence of oxygen, may cause degradation of natural colors (yellow and green for example) of the food.

Steps 40 to 60 take place in a clean room, i.e. in an environment provided with air treatment and contamination control systems, control of operators, matter and equipment.

It is to be noted that the present method eliminates cooking within the sealed packaged containers.

Figure 2:
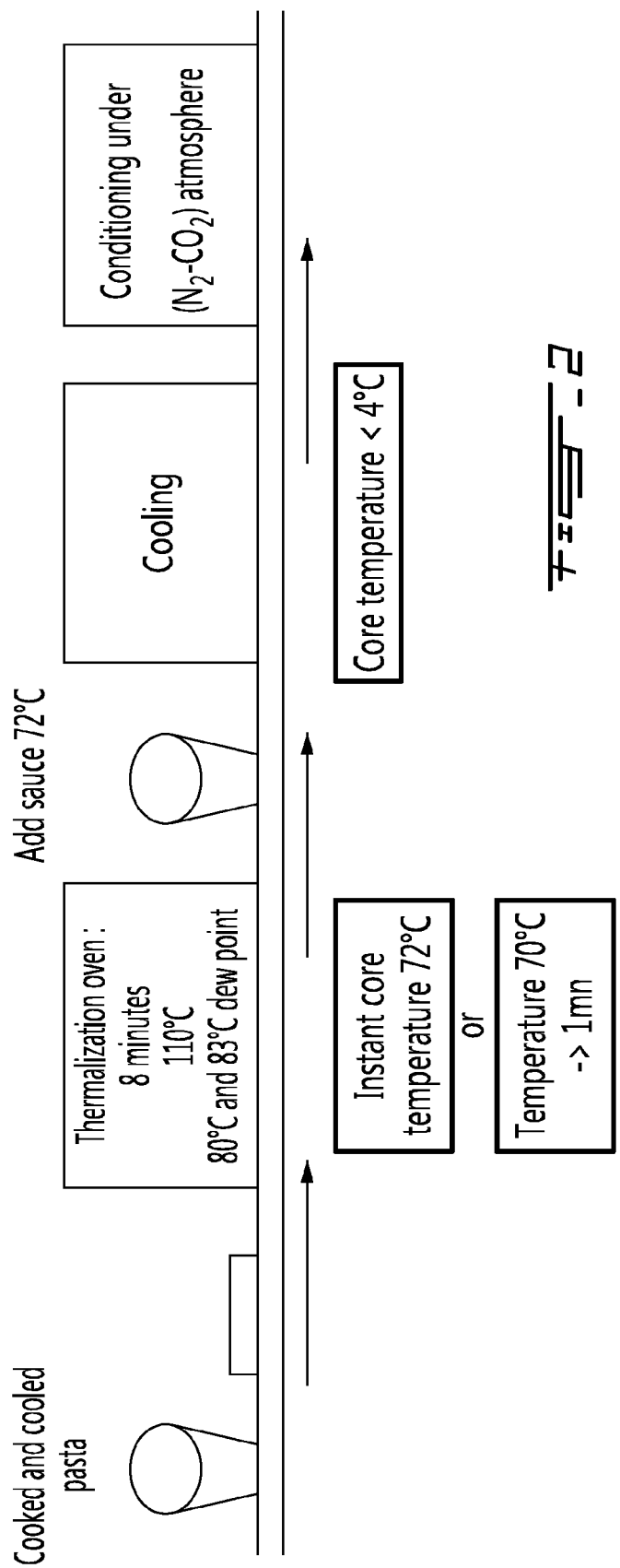
FIG. 2 is a flowchart of a method according to an embodiment of an aspect of the present invention.

FIG. 2 illustrates the present method in the case of a meal of tagliatelly and salmon with a sorrel sauce.

As people in the art will appreciate, introducing a sauce, if desired, in the container, besides the different food portions, after the thermalization step, allows obtaining plates where the food portions remain separated and not unduly wetted or covered by sauce.

The present method allows preparing fresh meals, elaborated from various food, and preserving them, maintaining the colors of each food portion, particularly in case of portions of green vegetable for example, and maintaining the gustatory characteristics of each food portion, in containers, without over drying nor over wetting of the different food portions, over periods of 20 days and more, for example 25 days, under refrigeration, as opposed to a shelf life of 6 to 7 days for comparable unprocessed fresh meals. These meals are ready to eat by reheating, without condensation within the containers, as a result of performing thermalization and cooling prior to sealing and of using sealing films with anti-fog properties. The packaged, ready-to heat, preservative-free meals of the present invention are provided in sealed containers having at least the top surface transparent and devoid of condensation. The containers may be totally see-through containers.

The present invention provides a method and system allowing preparing convenience food that looks fresh, looking and tasting as food freshly cooked.

The scope of the claims should not be limited by the embodiments set forth in the examples, but should be given the broadest interpretation consistent with the description as a whole.

The invention claimed is:

1. A method for preparing a ready-to heat, preservative free meal, comprising the following steps:
    selecting at least one food product;
    preparing said at least one food product;
    placing the at least one prepared food product within a container;
    thermalizing the at least one food product within the container by placing said container, uncovered, with said at least one prepared food product disposed therein within an oven, controlling the dew point of the atmosphere around said at least one prepared food product and reaching a core temperature of 70° C. for a duration of 1 minute;
    partially cooling down the thermalized at least one food product by cooling at a temperature in a range between −8° C. and −10° C. for a duration comprised in a range between 30 and 40 minutes to reach a core temperature in a range between 30° C. and 40° C.;
    conditioning the partially cooled at least one food product, including sealing the container; and
    further cooling down the conditioned at least one food product by cooling at a temperature in a range between −8° C. and −10° C. to reach a core temperature in a range between 0° C. and +4° C.

2. The method of claim 1, wherein said step of selecting at least one food product comprises selecting at least one of a protein portion, a portion of slow carbohydrates and a portion of vegetables.

3. The method of claim 1, wherein said step of selecting at least one food product comprises selecting at least one of a protein portion, a portion of slow carbohydrates, a portion of vegetables and a dressing.

4. The method of claim 1, wherein said step of preparing the at least one food product comprises at least one of precooking meat or fish, precooking rice or pasta, defrosting or scalding vegetables, preparing a purée, and preparing a dressing.

5. The method of claim 1, wherein said step of preparing said at least one food product comprises preparing an amount of dressing and maintaining the dressing at a temperature of at least 72° C. and wherein said amount of dressing is added to said container after said thermalizing.

6. The method of claim 1, wherein said sealing comprises individually sealing said container with a barrier film under controlled atmosphere.

7. The method of claim 1, wherein said sealing comprises individually sealing said container with a barrier film using a sealing ring.

8. The method of claim 1, wherein said container is made in a material suitable for food use and resistant to temperatures of at least 80° C.

9. The method of claim 1, wherein said container is made in a material suitable for food use and resistant to temperatures comprised in a range between 80° C. and 140° C.

10. The method of claim 1, wherein said step of partially cooling down and the step of conditioning are carried out in clean room conditions.

* * * * *